(12) United States Patent
McIntosh

(10) Patent No.: US 8,376,336 B2
(45) Date of Patent: Feb. 19, 2013

(54) STRIP OFF PIN CLAMP

(75) Inventor: Bruce D. McIntosh, Monroeville, IN (US)

(73) Assignee: PHD, Inc., Fort Wayne, IN (US)

( * ) Notice: Subject to any disclaimer, the term of this patent is extended or adjusted under 35 U.S.C. 154(b) by 520 days.

(21) Appl. No.: 12/485,172

(22) Filed: Jun. 16, 2009

(65) Prior Publication Data

US 2009/0315236 A1  Dec. 24, 2009

Related U.S. Application Data

(60) Provisional application No. 61/073,579, filed on Jun. 18, 2008.

(51) Int. Cl.
*B23Q 1/00* (2006.01)

(52) U.S. Cl. ............... 269/47; 269/32; 269/49; 269/24; 269/27

(58) Field of Classification Search ............. 269/47, 269/32, 49, 24, 27, 25, 26, 228
See application file for complete search history.

(56) References Cited

U.S. PATENT DOCUMENTS

| | | |
|---|---|---|
| 2,845,847 A | 8/1958 | Blatt et al. |
| 3,273,878 A | 9/1966 | Blatt |
| 3,362,703 A | 1/1968 | Blatt |
| 3,371,923 A | 3/1968 | Blatt |
| 3,436,072 A | 4/1969 | Svenson |
| 3,442,291 A | 5/1969 | Carls |
| 3,454,971 A | 7/1969 | Wolf |
| 3,482,830 A | 12/1969 | Sendoykas |
| 3,482,831 A | 12/1969 | Blatt |
| 3,567,208 A | 3/1971 | Blatt |
| 3,570,835 A | 3/1971 | McPherson |
| 3,618,931 A | 11/1971 | Blatt |
| 3,702,185 A | 11/1972 | Blatt |
| 3,757,963 A | 9/1973 | Binkley |
| 3,794,265 A | 2/1974 | Jantzen |
| 3,806,140 A | 4/1974 | Robertson |
| 4,021,027 A | 5/1977 | Blatt |
| 4,203,582 A | 5/1980 | Hart et al. |
| 4,240,620 A | 12/1980 | Tünkers |
| 4,396,183 A | 8/1983 | Lymburner |
| 4,458,889 A | 7/1984 | McPherson et al. |
| 4,494,739 A | 1/1985 | Valentine |
| 4,496,138 A | 1/1985 | Blatt |
| 4,564,151 A | 1/1986 | Pali |

(Continued)

FOREIGN PATENT DOCUMENTS

DE  4020981 A1  7/1990
DE  4030730 A1  9/1990

(Continued)

OTHER PUBLICATIONS

International Search Report dated Sep. 4, 2007.

(Continued)

*Primary Examiner* — George Nguyen
(74) *Attorney, Agent, or Firm* — Taylor IP, P.C.

(57) ABSTRACT

A pin clamp assembly is provided that includes a housing, a locating pin, and a finger. The locating pin is movable with respect to the housing. The locating pin can also selectively entirely retract inside the housing. A finger is supported by the locating pin and retractable and extendable into and out of the locating pin. The finger is also extendable out of the locating pin when at least a portion of the locating pin supporting the finger is exterior of the housing.

28 Claims, 10 Drawing Sheets

U.S. PATENT DOCUMENTS

| | | |
|---|---|---|
| 4,618,131 A | 10/1986 | Campisi et al. |
| 4,620,696 A | 11/1986 | Blatt |
| 4,723,767 A | 2/1988 | McPherson et al. |
| 4,827,835 A | 5/1989 | LaBair |
| 4,905,973 A | 3/1990 | Blatt |
| 4,909,130 A | 3/1990 | LaBair |
| 5,064,177 A | 11/1991 | Witt et al. |
| 5,067,606 A | 11/1991 | Schlatter et al. |
| 5,103,551 A | 4/1992 | Tamura et al. |
| 5,125,632 A | 6/1992 | Blatt et al. |
| 5,143,361 A | 9/1992 | McNamara et al. |
| 5,147,091 A | 9/1992 | Yonezawa et al. |
| 5,165,670 A | 11/1992 | Sawdon et al. |
| 5,171,001 A | 12/1992 | Sawdon |
| 5,182,848 A * | 2/1993 | Wheeler ............. 29/596 |
| 5,215,295 A | 6/1993 | Hoover |
| 5,257,774 A | 11/1993 | Dykstra |
| 5,271,651 A | 12/1993 | Blatt et al. |
| 5,303,908 A | 4/1994 | Halder |
| 5,350,163 A | 9/1994 | Lichtenberg |
| 5,440,968 A | 8/1995 | Sekine |
| 5,460,358 A | 10/1995 | Sendoykas |
| 5,490,663 A | 2/1996 | Stojkovic et al. |
| 5,575,462 A | 11/1996 | Blatt |
| 5,634,629 A | 6/1997 | Blatt |
| 5,657,972 A | 8/1997 | Blatt |
| 5,676,357 A | 10/1997 | Horn |
| 5,687,961 A | 11/1997 | Horn |
| 5,697,752 A | 12/1997 | Dugas et al. |
| 5,704,600 A | 1/1998 | Robinson |
| 5,762,325 A | 6/1998 | Blatt |
| 5,799,932 A | 9/1998 | Blatt |
| 5,816,567 A | 10/1998 | Horn |
| 5,823,519 A | 10/1998 | Tunkers |
| 5,845,897 A | 12/1998 | Tunkers |
| 5,845,898 A | 12/1998 | Halder et al. |
| 5,853,211 A | 12/1998 | Sawdon et al. |
| 5,871,250 A | 2/1999 | Sawdon |
| 5,884,903 A | 3/1999 | Sawdon |
| 5,938,257 A | 8/1999 | Blatt |
| 5,996,984 A | 12/1999 | Takahashi |
| 6,059,277 A * | 5/2000 | Sawdon et al. ............. 269/24 |
| 6,065,743 A | 5/2000 | Roudier et al. |
| 6,070,864 A | 6/2000 | Crorey |
| 6,076,816 A | 6/2000 | Tünkers |
| 6,102,383 A | 8/2000 | Tunkers |
| 6,105,947 A | 8/2000 | Dykstra |
| 6,115,898 A | 9/2000 | Sawdon |
| 6,129,345 A | 10/2000 | Chiorino |
| 6,158,728 A | 12/2000 | Smith |
| 6,186,517 B1 | 2/2001 | De Bruyn et al. |
| 6,189,877 B1 | 2/2001 | Boris et al. |
| 6,199,846 B1 | 3/2001 | Crorey |
| 6,199,847 B1 | 3/2001 | Fukui |
| 6,199,873 B1 | 3/2001 | Roudier et al. |
| 6,206,353 B1 | 3/2001 | Becker et al. |
| 6,220,588 B1 | 4/2001 | Tunkers |
| 6,279,886 B1 | 8/2001 | Grossart |
| 6,279,887 B1 | 8/2001 | Glasenapp et al. |
| 6,338,476 B1 | 1/2002 | Takahashi |
| 6,354,580 B1 | 3/2002 | Nagai et al. |
| 6,357,735 B2 | 3/2002 | Haverinen |
| 6,362,547 B1 | 3/2002 | Peterson et al. |
| 6,364,300 B1 | 4/2002 | Kita |
| 6,364,301 B1 | 4/2002 | Takahashi |
| 6,364,302 B2 | 4/2002 | Ausilio |
| 6,378,855 B1 | 4/2002 | Sawdon et al. |
| 6,378,856 B1 | 4/2002 | Takahashi |
| 6,416,045 B1 | 7/2002 | Morroney |
| 6,422,549 B2 | 7/2002 | Crorey |
| 6,435,494 B2 | 8/2002 | Takahashi et al. |
| 6,439,560 B2 | 8/2002 | Sawada et al. |
| 6,449,851 B1 | 9/2002 | Bone et al. |
| 6,457,920 B1 | 10/2002 | Kleiner |
| 6,471,199 B2 | 10/2002 | Nagai et al. |
| 6,540,217 B2 | 4/2003 | Takahashi et al. |
| 6,557,840 B2 | 5/2003 | Sawdon |
| 6,557,841 B2 | 5/2003 | Dellach et al. |
| 6,565,074 B1 | 5/2003 | Wheeler |
| 6,585,246 B2 | 7/2003 | McCormick et al. |
| 6,612,557 B2 | 9/2003 | Sawdon et al. |
| 6,616,133 B1 | 9/2003 | Wheeler et al. |
| 6,641,123 B2 | 11/2003 | Takahashi |
| 6,644,638 B1 | 11/2003 | McCormick |
| 6,648,316 B1 | 11/2003 | Vouland |
| 6,695,359 B2 | 2/2004 | Morel et al. |
| 6,698,736 B2 | 3/2004 | Dugas et al. |
| 6,719,281 B2 | 4/2004 | Kohlert |
| 6,727,194 B2 | 4/2004 | Yoo |
| 6,733,271 B2 | 5/2004 | De Nichilo |
| 6,736,385 B1 | 5/2004 | Beffrieu |
| 6,739,587 B2 | 5/2004 | Migliori |
| 6,786,478 B2 | 9/2004 | Pavlik et al. |
| 6,814,349 B2 | 11/2004 | Migliori |
| 6,845,975 B2 | 1/2005 | Tünkers |
| 6,869,068 B2 | 3/2005 | Zhao et al. |
| 6,877,730 B2 | 4/2005 | Sawdon et al. |
| 6,880,816 B1 | 4/2005 | Wheeler et al. |
| 6,883,795 B2 | 4/2005 | McCormick et al. |
| 6,902,159 B2 | 6/2005 | Sawdon et al. |
| 6,902,160 B1 | 6/2005 | Zajac, Jr. et al. |
| 6,908,077 B2 | 6/2005 | Sawdon |
| 6,913,254 B2 * | 7/2005 | Pavlik et al. ............. 269/49 |
| 6,931,980 B1 | 8/2005 | Zajac, Jr. et al. |
| 6,976,671 B2 | 12/2005 | Migliori |
| 6,997,447 B2 | 2/2006 | Fukui |
| 7,000,911 B2 | 2/2006 | McCormick et al. |
| 7,007,938 B2 | 3/2006 | Nakata et al. |
| 7,017,895 B2 | 3/2006 | Sakamoto |
| 7,017,897 B2 | 3/2006 | Cheah |
| 7,029,000 B2 | 4/2006 | Petit et al. |
| 7,036,808 B2 | 5/2006 | Cheah |
| 7,055,240 B2 * | 6/2006 | Kelley et al. ............. 29/787 |
| 7,066,459 B2 | 6/2006 | Tunkers |
| 7,182,326 B2 | 2/2007 | McIntosh et al. |
| 7,448,607 B2 * | 11/2008 | Steele et al. ............. 269/32 |
| 7,467,788 B2 | 12/2008 | McIntosh et al. |
| 7,516,948 B2 | 4/2009 | McIntosh et al. |
| 8,132,798 B2 | 3/2012 | McIntosh et al. |
| 8,132,799 B2 | 3/2012 | McIntosh et al. |
| 2002/0093131 A1 | 7/2002 | Dugas et al. |
| 2002/0100155 A1 | 8/2002 | Nakamura |
| 2004/0041323 A1 | 3/2004 | Migliori |
| 2004/0070130 A1 | 4/2004 | Pavlik et al. |
| 2004/0159996 A1 | 8/2004 | Migliori |
| 2004/0195747 A1 | 10/2004 | Migliori |
| 2004/0195750 A1 | 10/2004 | Migliori |
| 2004/0195751 A1 | 10/2004 | Migliori |
| 2004/0195752 A1 | 10/2004 | Migliori |
| 2005/0012258 A1 | 1/2005 | Migliori |
| 2005/0017423 A1 | 1/2005 | Kita et al. |
| 2005/0035515 A1 | 2/2005 | Hixon, Jr. et al. |
| 2005/0035516 A1 | 2/2005 | Sawdon et al. |
| 2005/0051939 A1 | 3/2005 | Beffrieu |
| 2005/0121843 A1 | 6/2005 | Maffeis |
| 2005/0225017 A1 | 10/2005 | Sakamoto |
| 2005/0230893 A1 | 10/2005 | Zajac, Jr. et al. |
| 2005/0242483 A1 | 11/2005 | McIntosh et al. |
| 2005/0269755 A1 | 12/2005 | Zhao et al. |
| 2006/0049565 A1 | 3/2006 | Petit et al. |
| 2006/0103063 A1 | 5/2006 | Liu et al. |
| 2006/0125167 A1 | 6/2006 | Steele et al. |
| 2006/0163790 A1 | 7/2006 | Xu et al. |
| 2007/0042632 A1 | 2/2007 | Patwardhan et al. |
| 2007/0267795 A1 | 11/2007 | Patwardhan et al. |
| 2008/0315477 A1 | 12/2008 | Alexander et al. |
| 2008/0315478 A1 | 12/2008 | McIntosh |
| 2009/0096146 A1 | 4/2009 | Steele et al. |
| 2009/0315236 A1 | 12/2009 | McIntosh |

FOREIGN PATENT DOCUMENTS

| | | |
|---|---|---|
| DE | 10004506 C1 | 2/2000 |
| EP | 0322617 A2 | 12/1987 |
| EP | 0256208 A2 | 2/1988 |
| EP | 0322617 A2 | 5/1989 |
| FR | 2755049 A1 | 4/1998 |
| FR | 2837118 A1 | 9/2003 |

| | | | |
|---|---|---|---|
| JP | 360123238 A | 7/1985 | |
| JP | 01193135 A | 8/1989 | |
| JP | 404143182 A | 5/1992 | |
| JP | 407328973 A | 12/1995 | |
| JP | 2001105379 | 4/2001 | |
| SU | 1593956 A1 | 9/1990 | |
| WO | WO 9635547 A1 | 11/1996 | |
| WO | WO 03/041913 A1 | 5/2003 | |

OTHER PUBLICATIONS

COMAU / PICO PC516 Pin Clamp Locator; Catalog Drawing Sht #1 as of Jan. 15, 2003.
Internal mechanism of Pin Clamp locator.

* cited by examiner

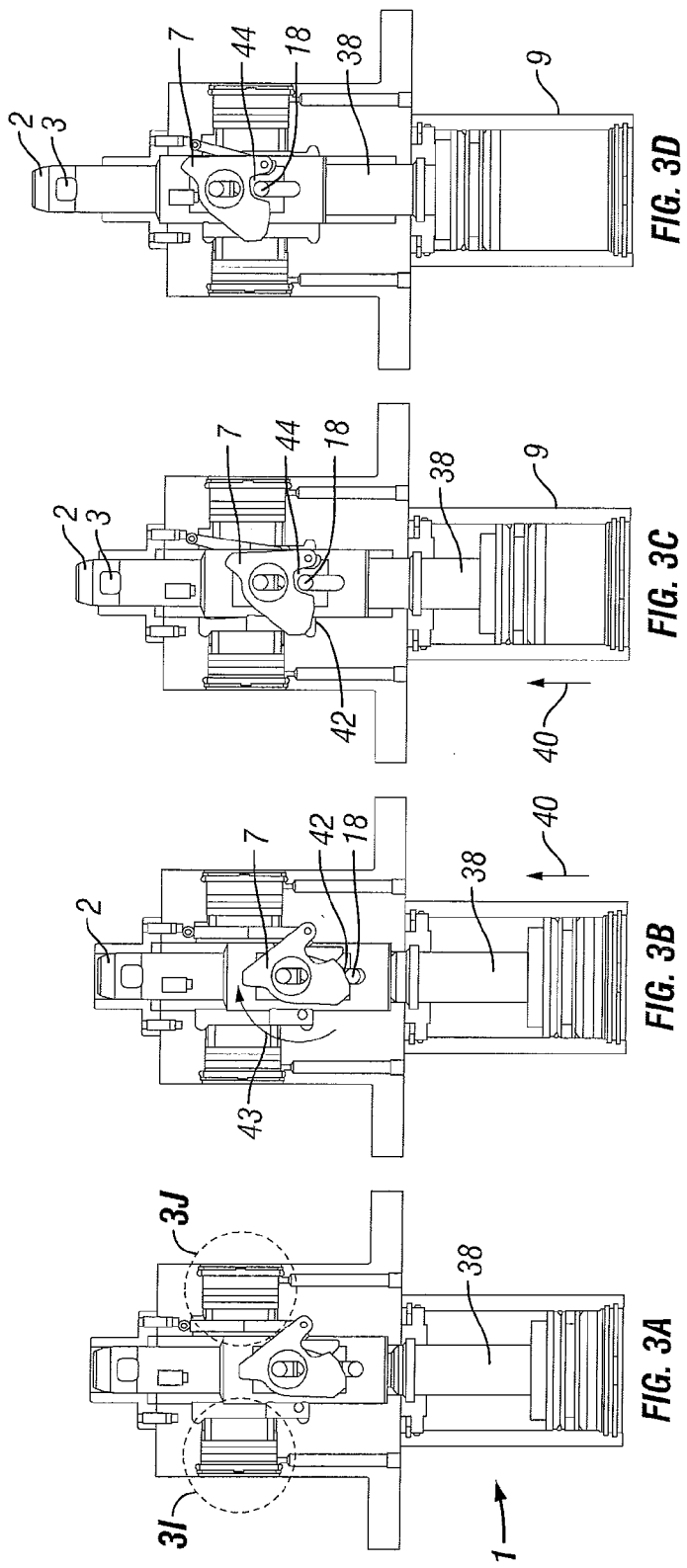

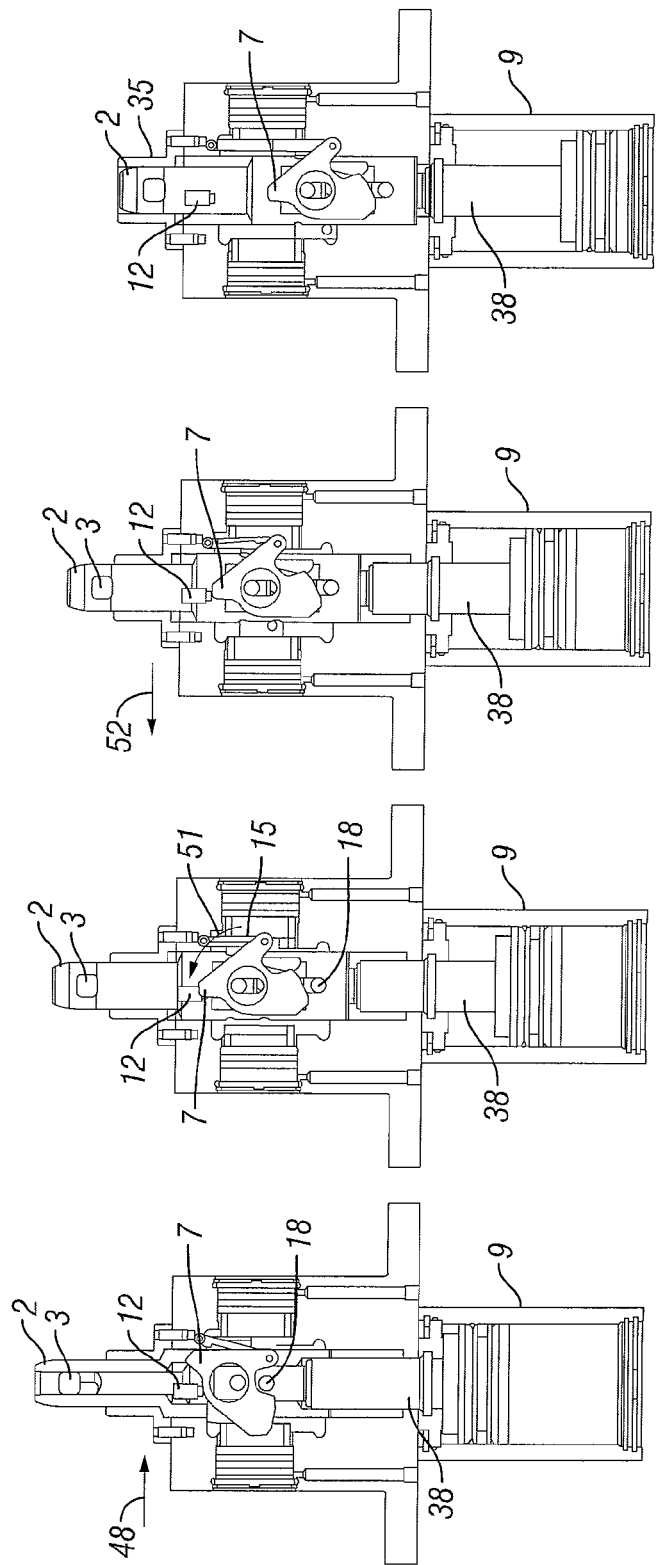

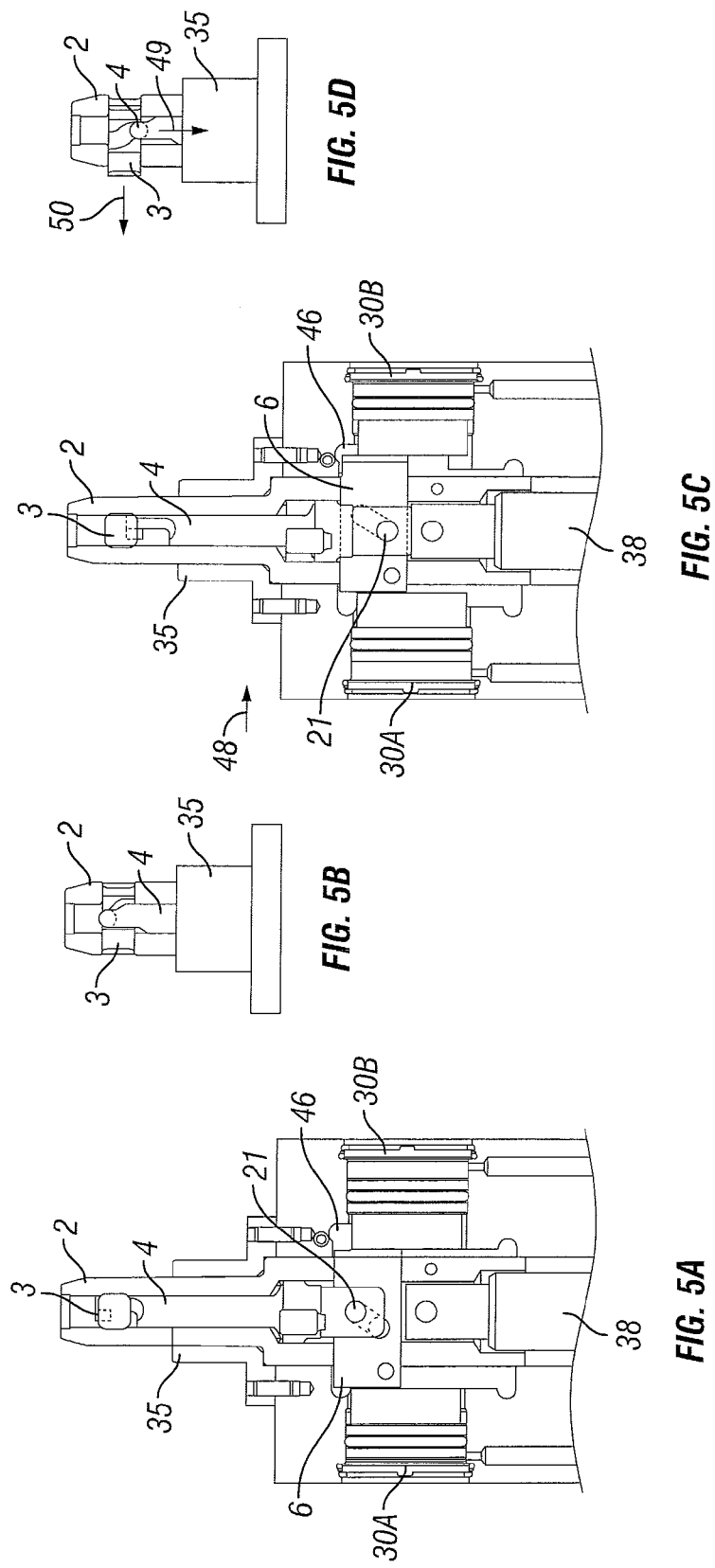

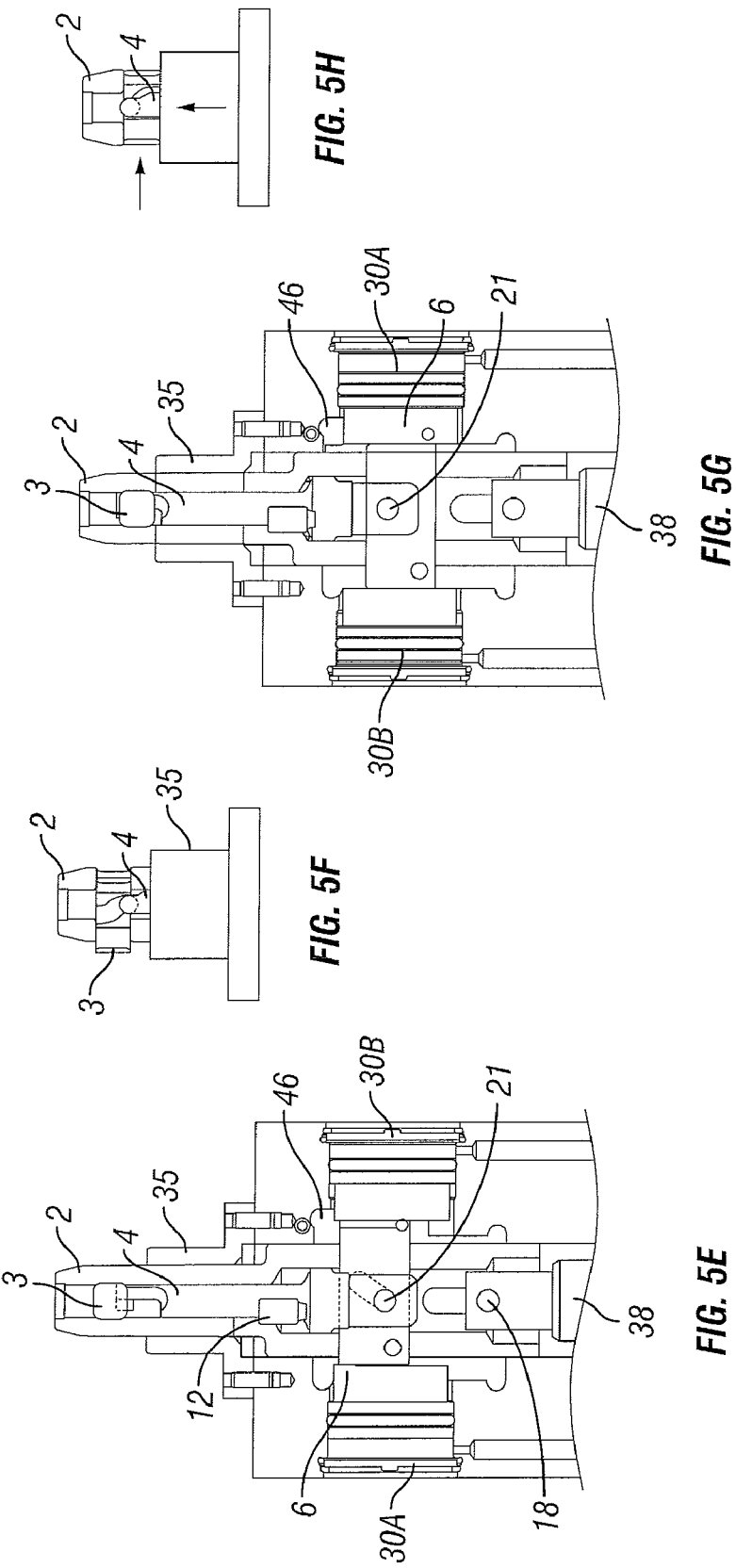

STRIP OFF PIN CLAMP

RELATED APPLICATIONS

The present application is related to and claims priority to U.S. Provisional Patent Application Ser. No. 61/073,579, filed on Jun. 18, 2008, entitled "Strip Off Pin Clamp." To the extent not included below, the subject matter disclosed in that application is hereby expressly incorporated into the present application.

TECHNICAL FIELD

The following disclosure is related to pin clamp assemblies, and more particularly to pin clamp assemblies that have a movable locating pin.

BACKGROUND AND SUMMARY

Locating pin clamps are known, such as those disclosed in U.S. Patent Application No. 60/559,364 filed Apr. 2, 2004; U.S. Patent Application No. 60/630,791 filed Nov. 24, 2004; U.S. Patent Application No. 60/636,304 filed Dec. 15, 2004; U.S. Patent Application No. 60/709,661 filed Aug. 19, 2005; U.S. patent application Ser. No. 11/284,446 filed Nov. 22, 2005; U.S. patent application Ser. No. 11/302,840 filed Dec. 12, 2005; U.S. Patent Publication No. 2005/045599 issued Dec. 15, 2005; U.S. Patent Application No. 60/765,759 filed Feb. 6, 2006; U.S. patent application Ser. No. 11/505,533 dated Aug. 17, 2006; U.S. Publication No. 2006/032564 issued Aug. 18, 2006; U.S. Publication No. 2006/060163 issued Oct. 23, 2006; U.S. patent application Ser. No. 11/700,660 filed Jan. 31, 2007; U.S. Publication No. 2007/061470 issued Feb. 21, 2007; U.S. Pat. No. 7,182,326 issued Feb. 27, 2007; patent application Ser. No. 11/679,536 filed Feb. 27, 2007; and U.S. Patent Application No. 60/945,017 filed Jun. 19, 2007. The texts of all of these applications/patent are incorporated herein by reference. Many types of pin clamps include a locating pin that is positioned through a bore or opening in a workpiece. The locating pin then extends a finger and clamps down on the workpiece holding it in place.

An illustrative pin clamp of the present disclosure has the ability to move the finger independent of the location of the locating pin. In another embodiment, the locating pin can be recessed below the surface of the clamp so a workpiece can be horizontally slid, rather than vertically placed on the clamp. In yet another embodiment, the finger can move independent of the location of the locating pin which can be recessed below the surface of the pin clamp. At least a portion of locating pins of prior pin clamps are still located exterior of the clamp body even when in the retracted position. Recessing the locating pin inside the clamp prior to extension means there are no obstructions to inhibit the workpiece from sliding onto the pin clamp. This offers a greater variety of uses not otherwise available to conventional pin clamps.

In an illustrative embodiment, the clamp includes multiple actuators. One actuator extends and retracts the locating pin while the second actuator extends and retracts the finger. Illustratively, the actuators can be pneumatic-driven and/or electrically-driven systems. It is appreciated that the finger may be a hook or other extending structure that can assist holding a workpiece. Also, the finger can have any variety of shapes, move in any variety of directions, and is not limited to the embodiments shown in the drawings. In further alternative embodiments, the pin clamp may be adapted to extend and retract more than one finger. In still further embodiments, a lock bracket may be employed to selectively limit the movement of the locating pin. In a further embodiment, the lock bracket prevents the locating pin from extending and loosening the finger's grip on the workpiece.

Another advantage using the embodiments shown herein is that the locating pin can be retracted even if the workpiece has a lateral force applied to it. The part support maintains the shape of the hole the locating pin is disposed in and keeps the workpiece perpendicular during motion of the locating pin. Conventional locating pins, on the other hand, may tilt which may cause the hole to deform and possibly damage the workpiece.

An illustrative embodiment of the disclosure includes a pin clamp assembly that comprises a housing, a locating pin, and a finger. The locating pin is movable with respect to the housing. The locating pin can also selectively entirely retract inside the housing. The finger is supported by the locating pin and is retractable and extendable into and out of the locating pin. The finger is also extendable out of the locating pin when at least a portion of the locating pin supporting the finger is exterior of the housing.

In the above and other embodiments, the pin clamp assembly may also include: movement of the finger being independent of movement of the locating pin; a surface located on the housing, wherein the surface identifies a plane; the locating pin further comprising a tip at its proximal end wherein the tip of the locating pin does not extend beyond the plane when the locating pin is entirely retracted inside the housing; when the locating pin is selectively entirely retracted inside the housing, the pin clamp assembly is configured to receive a workpiece that moves laterally with respect to the pin clamp assembly; a first actuator that contributes to moving the locating pin without moving the finger; a second actuator that contributes to moving the finger without moving the locating pin; first and second actuators wherein the first actuator moves the locating pin and the second actuator moves the finger; first and second actuators comprising either pneumatic or electrical systems; the finger including a hook; a second finger supported by the locating pin and is retractable and extendable into and out of the locating pin; a lock bracket that selectively limits movement of the locating pin; the lock bracket preventing the locating pin from extending and loosening the finger's grip on the workpiece; a lock that selectively blocks movement of the locating pin; wherein the lock pivots to selectively block movement of the locating; further comprising a spring that attaches to the lock bracket to assist moving the lock bracket; a part support that includes an opening configured to receive the locating pin and include the surface to support the workpiece; a dowel located in the housing and disposed in a movable piston rod and in an opening in the locating pin, wherein the piston rod is selectively movable without moving the locating pin; a first actuator that moves the piston rod causing the pin to engage a cam surface on the lock bracket which engages a cavity surface in the housing preventing the lock bracket from rotating; as piston rod continues to move, the locking bracket and locating pin also move; as the piston rod and locating pin continue to extend, the finger is retracted; once the locating pin has extended enough that the locking bracket clears the cavity surface, the locking bracket rotates and stops when a dowel engages a clearance notch in the locking bracket; both the locating pin and locking bracket continue to move so the locating pin extends exterior of the housing after the dowel engages the clearance notch; a cam that is movable laterally with respect to the locating pin, and wherein when the locating pin is extended; at least a portion of the cam is movable exterior of the locating pin; an actuator that acts on the cam to move it laterally with respect to the locating pin; a drive rod in communication with the cam and with the finger such that as the cam moves the drive rod relative to the locating pin, the cam causes the drive rod to extend the finger from the locating pin; as the finger remains extended, the locating pin being retractable allowing lock bracket to be rotatable via a spring; the locking bracket is engagable with a stop; the stop is adjustable; and once the lock bracket engages the stop, the locating pin is prevented from extending further out of the housing.

Additional features and advantages of the strip-off pin clamp, either alone or in combination with other features and advantages, will become apparent to those skilled in the art upon consideration of the following detailed descriptions exemplifying the best mode of carrying out the strip off pin clamp as presently perceived.

Further, the abstract and background of this disclosure is provided to enable the U.S. Patent and Trademark Office, those skilled in the art, and the public at large (including those whom are not familiar with patent or legal terms or phraseology or necessarily versed in the relevant art) to determine from a cursory inspection the nature of the subject matter in this disclosure. Neither the abstract nor summary is provided, nor should be interpreted to limit the scope of any claimed invention.

BRIEF DESCRIPTION OF THE DRAWINGS

The present disclosure will be described hereafter with reference to the attached drawings which are given as non-limiting examples only, in which:

FIGS. 3a-j are side elevational cross-section, and detailed views depicting the progression of operation of the illustrative pin clamp assembly;

FIGS. 5a-h are several cross-sectional detailed views of a portion of the pin clamp assembly demonstrating movement of the finger in response to movement of other structures in the pin clamp assembly.

Corresponding reference characters indicate corresponding parts throughout the several views. The exemplification set out herein illustrates embodiments of the pin clamp assembly, and such exemplification is not to be construed as limiting the scope of the pin clamp assembly in any manner.

DISCLOSURE OF ILLUSTRATIVE EMBODIMENTS

Figure 1B:
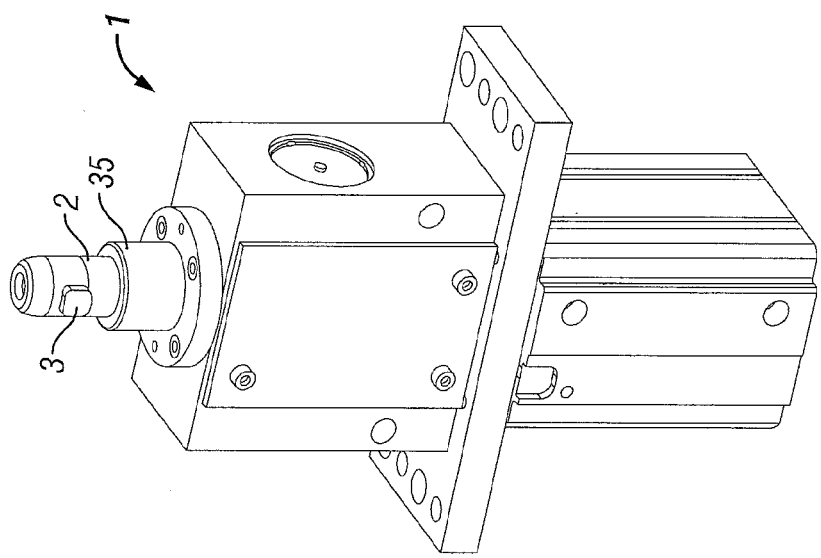
FIGS. 1a and b are perspective views of an illustrative embodiment of a pin clamp assembly.
Figure 1A:
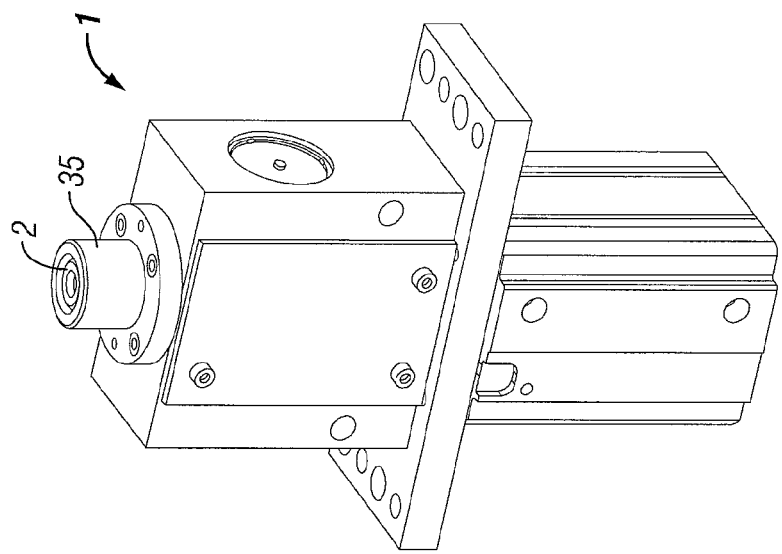

Perspective views of pin clamp assembly 1 are shown in FIGS. 1a and b. Clamp 1 shown in FIG. 1a demonstrates that locating pin 2 can be recessed below part support 35. This provides a flush surface for a workpiece to slide onto. The view in FIG. 1b shows the same pin clamp assembly 1 with locating pin 2 and finger 3 extended. At this point, locating pin 2 can be retracted to hold the workpiece.

Figure 2:
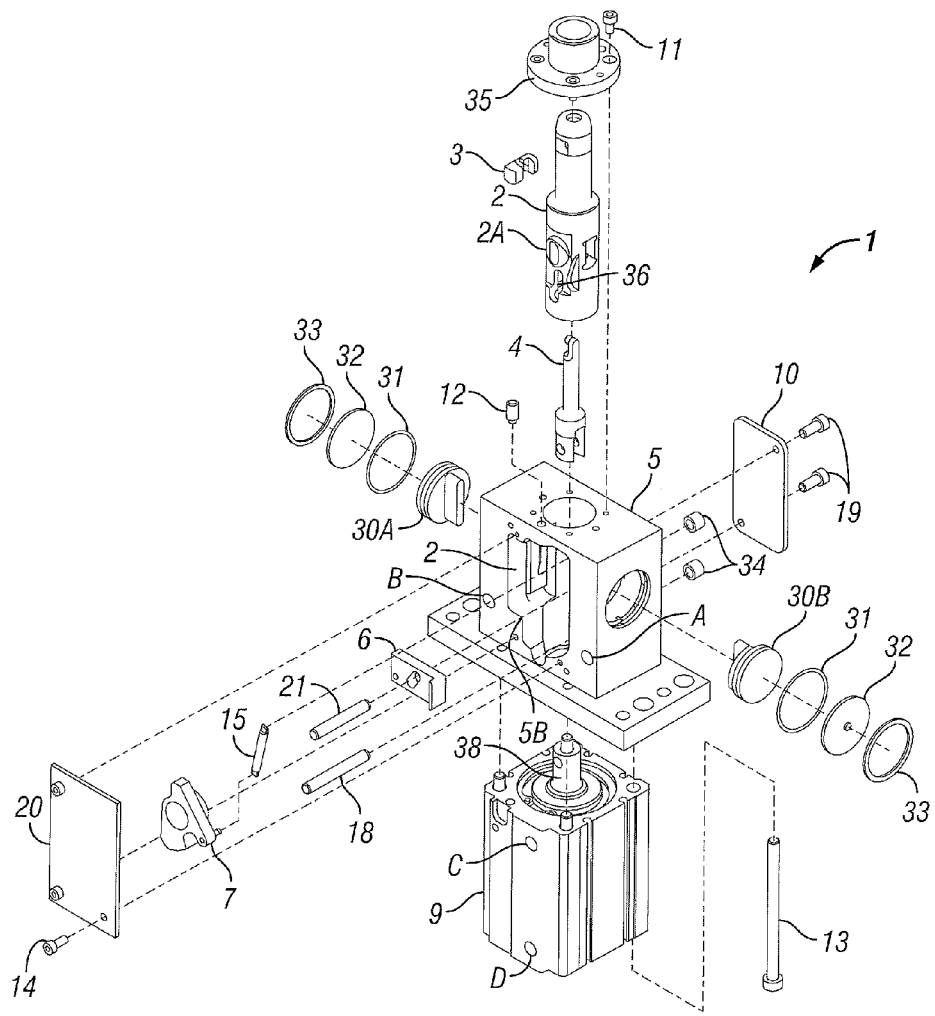
FIG. 2 is an exploded view of the illustrative pin clamp assembly of FIG. 1.

An exploded view of pin clamp assembly 1 is shown in FIG. 2. This illustrative embodiment includes locating pin 2 inserted into body assembly 5. Finger 3 is extendable and retractable in an opening of locating pin 2. It is appreciated that the clamp can be adapted to extend and retract a plurality of fingers. A drive rod 4 is insertable within locating pin 2 and movable relative thereto. A sequence cam 6 is located in a cavity inside body assembly 5 and is movable laterally to move drive rod 4 relative to locating pin 2 to extend and retract finger 3. Lock bracket 7 pivots on boss 2A to selectively block upward movement of locating pin 2. Cylinder assembly 9 illustratively attaches to body 5 via fasteners 13 and is configured to move locating pin 2 linearly. Cover plate 10 attaches to body 5 via fasteners 19 to cover the cavity inside body 5. A set screw 12 is disposed in body 5 and extends into the cavity to adjustably lock bracket 7. Another illustrative cover plate 20 is attached to housing 5 via fasteners 14. Similar to cover 10, cover 20 covers the cavity in housing 5. A tension spring 15 attaches to lock bracket 7 and body 5 to bias movement of lock bracket 7.

Illustrative dowel pin 18 is located in the cavity of housing 5 and is disposed in piston rod 38 from cylinder 9 and locating pin 2, coupling the two together. It is appreciated that in this illustrative embodiment, locating pin 2 has a slot 36 that receives dowel pin 18. It is slotted so that the piston rod in cylinder 9 can move without moving locating pin 2. In alternative embodiments, the slot may be a hole so the piston rod cannot move without moving the locating pin if locking bracket 7 was not used. A drive rod dowel pin 21, also located in the cavity of housing 5, is disposed through slot 37 of sequence cam 6, as well as a bore in drive rod 4. This allows drive rod dowel pin 21 to move drive rod 4 depending on its position within slot 37. Strip off piston assemblies 30a and 30b are positioned axially opposed to each other within body 5 to act on sequence cam 6. Movement of piston assemblies 30a and 30b cause sequence cam 6 to move which positions drive rod dowel pin 21 to be located in various positions within slot 37 which causes drive rod 4 to extend or retract which moves finger 3. Each strip off piston assembly illustratively includes a bore plug seal 31, bore plug 32, and a retaining ring 33. Rollers 34 are illustratively press-fit on pins 18 and 20 for restricting their motion.

Figure 3I:
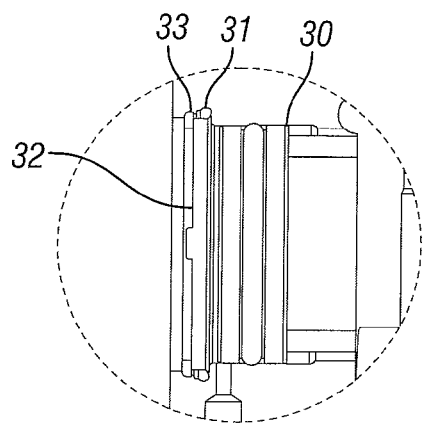
Figure 3J:
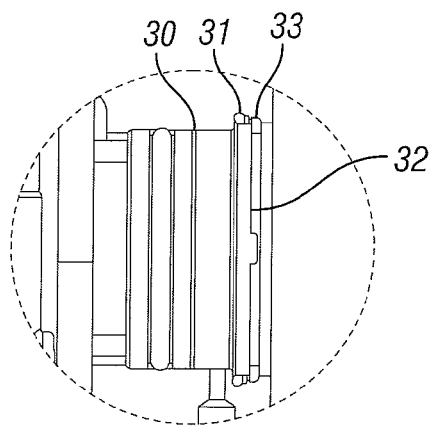
Figure 4C:
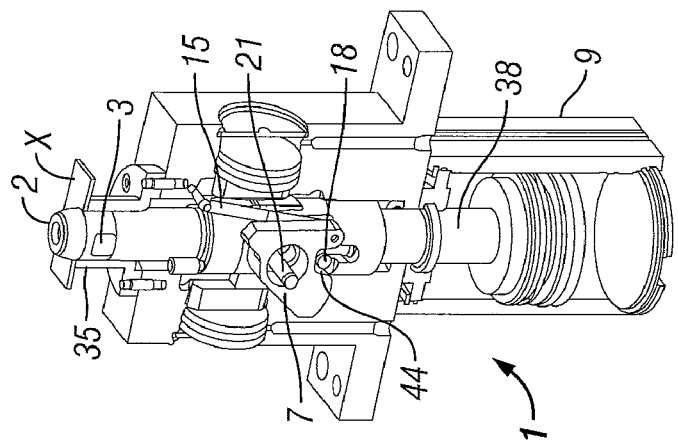
FIGS. 4a-h are perspective elevational cutaway views showing the progression of a workpiece being moved to, clamped by, and then removed from the pin clamp assembly.

The operation of pin clamp assembly 1 will be described herein using FIGS. 3a-j, FIGS. 4a-h, and FIGS. 5a-h. At a first position, pin clamp assembly 1, as shown in FIGS. 3a and 4a, includes locating pin 2 in fully retracted position. Pneumatic ports A and C are illustratively pressurized (see, also, FIG. 2), and piston rod 38 is retracted in cylinder assembly 9. As shown in these views, locating pin 2 is retracted within part support 35. This is in contrast to conventional pin clamps that retract their locating pins, but not enough to recede fully into the body. The effect of locating pin 2 being fully retracted inside clamp assembly 1 is that a workpiece X, as shown in FIG. 4a, can slide laterally onto pin clamp assembly 1, as indicated by directional arrow 39. Conventional pin clamps require the workpiece to descend vertically onto the locating pin, since the locating pin always extends from the body at least to some extent. This pin clamp offers expanded capabilities not otherwise available to conventional pin clamps, since it conforms to the needs of the environment, rather than the other way around.

Figure 4B:
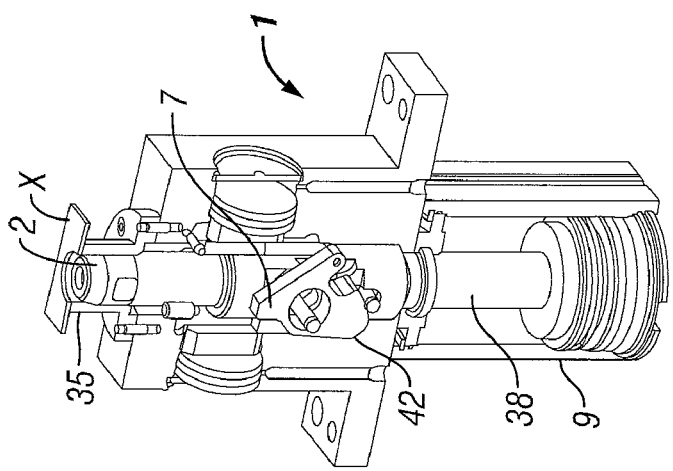
Figure 4A:
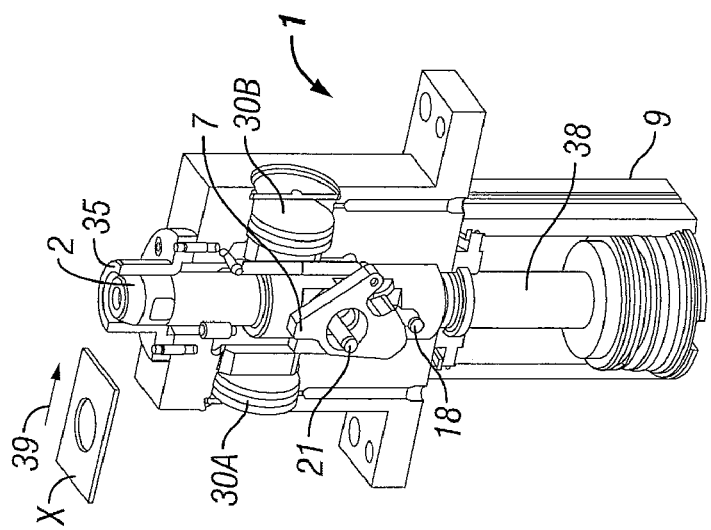

As shown in FIGS. 3b and 4b, when ports A and D are pressurized (see, also, FIG. 2), piston rod 38 begins moving upward, as indicated by directional arrow 40. Pin 18 is caused to contact cam surface 42 on lock bracket 7. This causes bracket 7 to attempt rotating illustratively clockwise according to directional arrow 43, but cannot appreciably do so because surface Z (see, also, FIG. 2) on housing 5 prevents bracket 7 from rotating.

As piston rod 38 continues to extend in direction 40, locking bracket 7 also moves in direction 40 which also moves locating pin 2 by virtue of its attachment to bracket 7 thereto via boss 2A.

As shown in the views of FIGS. 3c and 4c, ports A and D continue to be pressurized (see, also, FIG. 2), and piston rod 38 and locating pin 2 continue to extend. It is also notable in this illustrative embodiment that finger 3 is still retracted. Once locating pin 2 has extended upward in direction 40 enough that bracket 7 clears corner 5b in housing 5 (see, also, FIG. 2), bracket 7 rotates illustratively clockwise in direction 43. In an illustrative embodiment, bracket 7 rotates about 40° C. and stops when dowel pin 18 moves into clearance notch 44. Both locating pin 2 and bracket 7 continue to extend upward in direction 40 extending locating pin 2 to exterior of parts support 35.

Figure 4F:
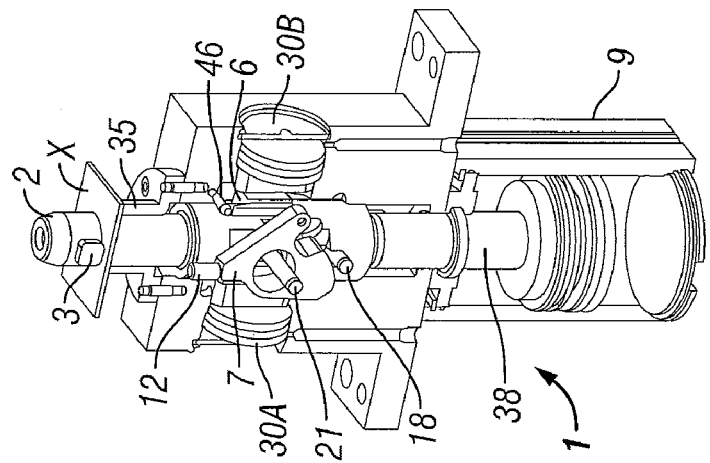
Figure 4E:
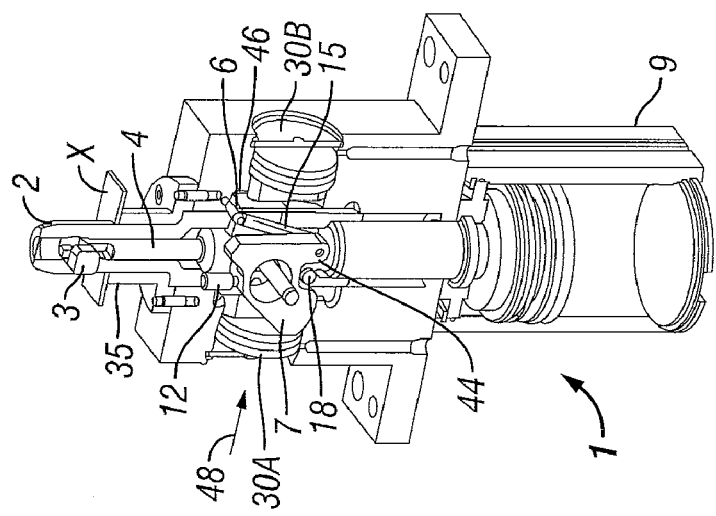
Figure 4D:
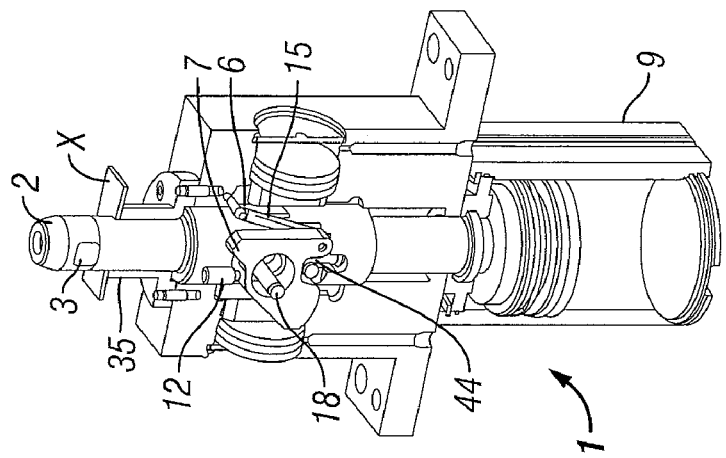

As shown in FIGS. 3d, 4d, and 5a and b, with ports A and D continuing to be pressurized (see, also, FIG. 2), locating pin 2 becomes fully extended. The piston assembly in actuator 9 is also fully extended and stops moving. At this point, however, finger 3 is still retracted. A sequence cam 6 is now positioned in slot 46 that extends both sides of locating pin 2 in housing 5. Sequence cam 6 is also free to slide back and forth in slot 46. Sequence cam 6 assists in extending and retracting finger 3, as force is applied to it. Illustratively, workpiece X could be top loaded at this stage if needed. As shown in FIGS. 5a and b, sequence cam 6 is also positioned adjacent strip off piston assemblies 30A and 30B in slot 46 of housing 5. (See, also, FIGS. 3I and J.)

As shown in FIGS. 3e, 4e, and 5c and d, ports B and D are pressurized (see, also, FIG. 2). Locating pin 2 is still fully extended. By pressurizing port B, piston 3a pushes sequence cam 6 in direction 48 along with piston assembly 3b. Sequence cam 6 moves drive rod 4 downward, as illustratively shown in direction 49, and as further shown in FIGS. 5c and d, causing finger 3 to extend out of locating pin 2.

As shown in FIGS. 3f, 4f and 5c and f, ports B and C are pressurized (see, also, FIG. 2). Locating pin 2 retracts while finger 3 remains extended. Retracting locating pin 2 allows lock bracket 7 to begin rotating counter-clockwise in direction 51, as shown in FIGS. 3f and 4f. This movement is caused by spring 15. Continued rotation of bracket 7 positions it under an illustrative stop member which is illustratively adjustable set screw 12. Once lock bracket 7 is located under set screw 12, locating pin 2 can no longer extend. In other words, locating pin 2 is locked in place. Workpiece X is being held on part support 35 with finger 3 extended holding it down. Work can now be done on the workpiece.

Figure 4G:
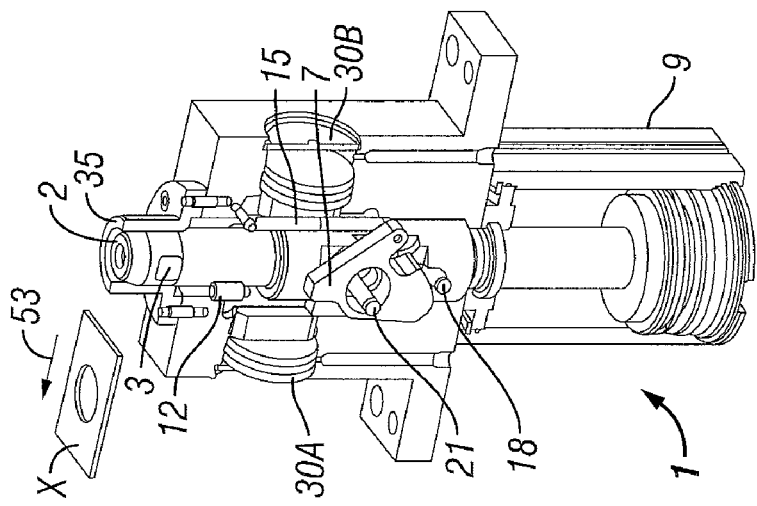

To continue the sequence, as shown in FIGS. 3g, 4g, and 5g and h, pressure is dropped (about 0 psi) at ports B, D and C. Port A is then pressurized which causes piston assembly 30b to push sequence cam 6 in direction 52 along with piston assembly 30a. Sequence cam 6 also moves drive rod 4 up causing finger 3 to retract inside locating pin 2, as shown in FIGS. 5g and h.

Figure 4H:
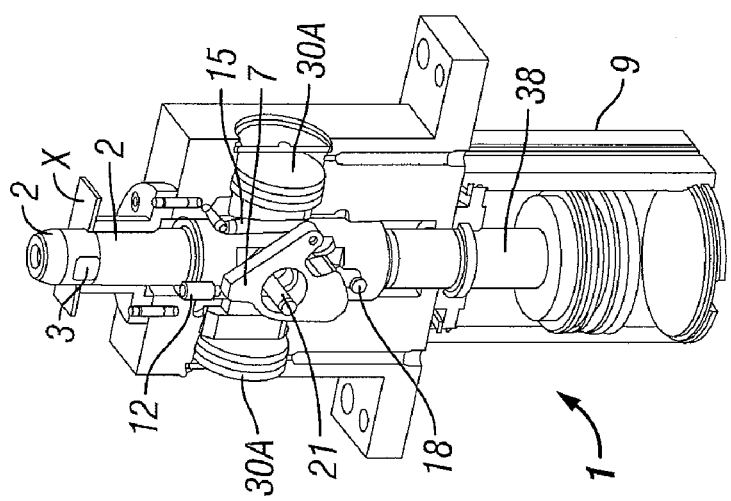

Continuing the sequence, adding pressure to ports A and C causes pin 2 to retract within part support 35, as shown in FIGS. 3h and 4h. (See, also, FIG. 2.) Now workpiece X can be removed from part support 35 laterally either in direction 53 as shown in FIG. 4h, in direction 39, or in another lateral direction.

Corresponding reference characters indicate corresponding parts throughout the several views. The exemplification set out herein illustrates in one form and such exemplification is not to be construed as limiting the scope of the invention in any manner.

What is claimed is:

1. A pin clamp assembly comprising:
   a housing;
   a locating pin movable with respect to the housing;
   wherein the locating pin can selectively entirely retract inside the pin clamp;
   a finger supported by the locating pin and retractable and extendable into and out of the locating pin;
   wherein the finger is extendable out of the locating pin when at least a portion of the locating pin supporting the finger is exterior of the housing; and
   a first actuator that contributes to moving the locating pin without moving the finger.

2. The pin clamp assembly of claim 1, wherein movement of the finger is independent of movement of the locating pin.

3. The pin clamp assembly of claim 1, further comprising a surface located on the housing, wherein the surface identifies a plane; the locating pin further comprising a tip at its proximal end wherein the tip of the locating pin does not extend beyond the plane when the locating pin is retracted entirely inside the housing.

4. The pin clamp assembly of claim 3, wherein when the locating pin is selectively entirely retracted inside the housing the pin clamp assembly is configured to receive a workpiece that moves laterally with respect to the pin clamp assembly.

5. The pin clamp assembly of claim 1, further comprising a second actuator that contributes to moving the finger without moving the locating pin.

6. The pin clamp assembly of claim 1, further comprising first and second actuators wherein the first actuator moves the locating pin and the second actuator moves the finger.

7. The pin clamp assembly of claim 6, wherein the first and second actuators comprise either pneumatic or electrical systems.

8. The pin clamp assembly of claim 1, wherein the finger includes a hook.

9. The pin clamp assembly of claim 1, further comprising a second finger supported by the locating pin and is retractable and extendable into and out of the locating pin.

10. The pin clamp assembly of claim 1, further comprising a lock bracket that selectively limits movement of the locating pin.

11. The pin clamp assembly of claim 10, wherein the lock bracket prevents the locating pin from extending to loosen the finger's grip on the workpiece.

12. The pin clamp assembly of claim 10, wherein the lock bracket pivots to selectively block movement of the locating pin.

13. The pin clamp assembly of claim 10, further comprising a spring that attaches to the lock bracket to assist moving the lock bracket.

14. The pin clamp assembly of claim 4, further comprising a part support that includes an opening configured to receive the locating pin and includes the surface to support the workpiece.

15. The pin clamp assembly of claim 14, further comprising a dowel located in the housing and disposed in a movable piston rod and in an opening in the locating pin, wherein the piston rod is selectively movable without moving the locating pin.

16. The pin clamp assembly of claim 15, further comprising a first actuator that moves the piston rod causing the pin to engage a cam surface on the lock bracket which engages a cavity surface in the housing preventing the lock bracket from rotating.

17. The pin clamp assembly of claim 16, wherein as piston rod continues to move, the locking bracket and locating pin also move.

18. The pin clamp assembly of claim 17, wherein as piston rod and locating pin continue to extend, the finger is retracted.

19. The pin clamp assembly of claim 18, wherein once the locating pin has extended enough that the locking bracket clears the cavity surface, the locking bracket rotates and stops when a dowel engages a clearance notch in the locking bracket.

20. The pin clamp assembly of claim 19, wherein both the locating pin and locking bracket continue to move so the locating pin extends exterior of the housing after the dowel engages the clearance notch.

21. The pin clamp assembly of claim 20, further comprising a cam that is movable laterally with respect to the locating pin, and wherein when the locating pin is extended.

22. The pin clamp assembly of claim 21, wherein at least a portion of the cam is movable exterior of the locating pin.

23. The pin clamp assembly of claim 22, further comprising an actuator that acts on the cam to move it laterally with respect to the locating pin.

24. The pin clamp assembly of claim 23, further comprising a drive rod in communication with the cam and with the finger such that as the cam moves the drive rod relative to the locating pin, the cam causes the drive rod to extend the finger from the locating pin.

25. The pin clamp assembly of claim 24, wherein as the finger remains extended, locating pin is retractable allowing lock bracket to be rotatable via a spring.

26. The pin clamp assembly of claim 25, wherein the locking bracket is engageable with a stop.

27. The pin clamp assembly of claim 26, wherein the stop is adjustable.

28. The pin clamp assembly of claim 27, wherein once the lock bracket engages the stop the locating pin is prevented from extending further out of the housing.

* * * * *